United States Patent
Hietala et al.

[11] Patent Number: 5,237,629
[45] Date of Patent: Aug. 17, 1993

[54] DIGITALLY CONTROLLED DISTRIBUTED PHASE SHIFTER

[75] Inventors: Vincent M. Hietala; Stanley H. Kravitz, both of Placitas; Gregory A. Vawter, Albuquerque, all of N. Mex.

[73] Assignee: The United States of America as represented by the United States Department of Energy, Washington, D.C.

[21] Appl. No.: 854,024

[22] Filed: Mar. 19, 1992

[51] Int. Cl.$^5$ .............................. G02B 6/10; H01P 3/00
[52] U.S. Cl. .......................................... 385/3; 385/2; 385/24; 385/40; 385/131; 333/138; 333/139; 333/157; 333/164
[58] Field of Search .................... 385/2, 3, 8, 24, 130, 385/131, 132, 40; 333/138, 139, 141, 144, 156, 157, 161, 164, 203

[56] References Cited

U.S. PATENT DOCUMENTS

| | | | |
|---|---|---|---|
| 3,789,329 | 1/1974 | Johnson | 333/31 R |
| 4,263,570 | 4/1981 | De Fonzo et al. | 333/157 |
| 4,288,785 | 9/1981 | Papuchon et al. | 385/3 X |
| 4,502,037 | 2/1985 | Le Parquier et al. | 385/3 X |
| 4,599,585 | 7/1986 | Vorhaus et al. | 333/164 |
| 4,630,011 | 12/1986 | Neidert et al. | 333/164 |
| 4,647,789 | 3/1987 | Upadhyayula | 307/262 |
| 4,649,393 | 3/1987 | Rittenbach | 342/371 |
| 4,652,883 | 3/1987 | Andricos | 342/372 |
| 4,694,276 | 9/1987 | Rastegar | 385/3 X |
| 4,841,552 | 6/1989 | Kingston | 377/43 |
| 4,991,920 | 2/1991 | Peczalski | 385/14 |
| 5,101,450 | 3/1992 | Olshansky | 385/3 |
| 5,157,744 | 10/1992 | Korotky | 385/3 X |
| 5,168,534 | 12/1992 | McBrien et al. | 385/3 |

OTHER PUBLICATIONS

R. Neidert et al., "Voltage Variable Microwave Phase Shifter", Electronics Letters, vol. 21, No. 14, pp. 636-637, Jul. 1985.

V. Hietala et al., "Broadband Continuously Variable Microwave Phase Shifter Employing a Distributed Schottky Contact on Silicon", Electronics Letters, vol. 23, No. 13, pp. 675-677, Jun. 1987.

J. Mendoza-Alvarez et al., "Analysis of Depletion Edge Translation Lightwave Modulators", *Journal of Lightwave Technology*, vol. 6, No. 6, pp. 793-808, Jun. 1988.

*Primary Examiner*—Brian Healy
*Attorney, Agent, or Firm*—Karla Ojanen; James H. Chafin; William R. Moser

[57] ABSTRACT

A digitally controlled distributed phase shifter is comprised of N phase shifters. Digital control is achieved by using N binary length-weighted electrodes located on the top surface of a waveguide. A control terminal is attached to each electrode thereby allowing the application of a control signal. The control signal is either one or two discrete bias voltages. The application of the discrete bias voltages changes the modal index of a portion of the waveguide that corresponds to a length of the electrode to which the bias voltage is applied, thereby causing the phase to change through the underlying portion of the waveguide. The digitally controlled distributed phase shift network has a total phase shift comprised of the sum of the individual phase shifters.

19 Claims, 3 Drawing Sheets

5,237,629

DIGITALLY CONTROLLED DISTRIBUTED PHASE SHIFTER

The United States Government has rights in this invention pursuant to Contract No. DE-AC04-76DP00789 between the U.S. Department of Energy and American Telephone and Telegraph Company.

FIELD OF THE INVENTION

This invention relates generally to digital distributed phase shifters and relates particularly to a digitally controlled distributed phase shifter network wherein each phase shifter within the network has a binary weighted length.

BACKGROUND OF THE INVENTION

Phase shifters delay a signal so that the phase of the signal is shifted by a desired amount, typically measured in degrees or radians. A distributed phase shifter is one in which the phase shift occurs along the entire length of the device. Controlled phase shifters are used in numerous optical and microwave applications such as modulation schemes in coherent-optical communication systems, control of microwave phased array antennas, and signal processing applications in optics and microwave systems.

Analog phase shifters typically utilize a varying DC bias level to achieve a desired phase change of a radiation signal propagating through a waveguide. The relationship between DC bias level and phase shift, however, it generally not a linear one.

Digitally controlled phase shifters typically utilize a digital to analog converter to produce an analog signal required for phase modulation. The utilization of digital to analog converters, however, increases complexity, cost, and power consumption.

It is thus an object of the invention to provide a digitally controlled distributed phase shifter that does not require the use of digital to analog converters.

It is a further object to provide a digital distributed phase shifter that linearly varies the phase of a radiation signal with changes in a digital control word applied to the phase shifter.

SUMMARY OF THE INVENTION

The foregoing problems are overcome and other advantages are realized by a digitally controlled distributed phase shifter network comprised of a number of phase shifters, each having a binary weighted length.

For an optical phase shifter embodiment, the digital control is achieved by using N-length binary-weighted electrodes. The electrodes are comprised of a metal contact conductively coupled to a p+ semiconductor layer of a ridge-type waveguide. The p+ semiconductor layer provides improved conductivity and is located on the top-surface of the waveguide. The binary weighting of the electrode's length takes advantage of the distributed nature of the phase shift element, allowing N-bit digital control of the phase shift. A control terminal is attached to each electrode thereby allowing the application of a control signal of either one or two discrete bias voltages. The application of the discrete bias voltages changes the modal index of refraction of the portion of the waveguide that corresponds to the electrode to which the bias voltage was applied, thereby causing the phase of the radiation to change as it propagates through that portion of the waveguide.

The digitally controlled distributed phase shifter has a total phase shift comprised of the sum of the phase shift provided by each discrete phase shifter. The technique guarantees the perfect linearization of the phase control as only of two discrete bias voltages are applied to the electrodes.

Any nonlinearity between the two voltage states used is irrelevant. The device is inherently linear provided that the number of electrodes, N where $1 \leq n \leq N$, are related in length by $L_n = (L_{n-1})/2$. The length of each electrode is defined photolighographically so that any errors in length are minimized.

DETAILED DESCRIPTION O THE INVENTION

Figure 1A:
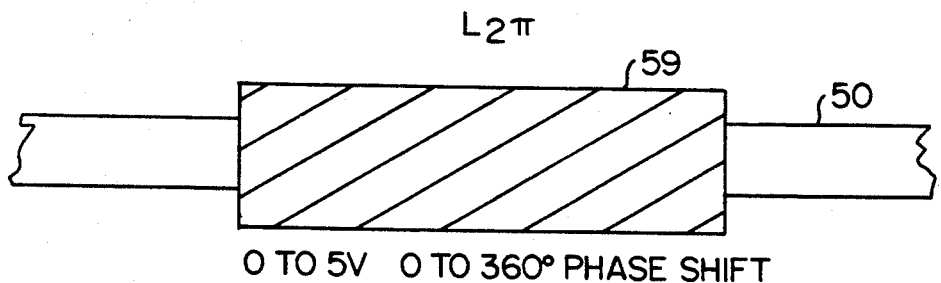
FIG. 1a illustrates an analog phase shifter.
Figure 1B:
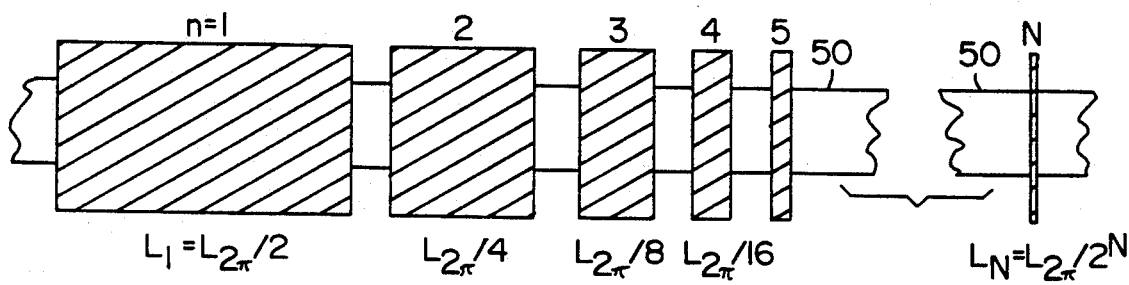
FIG. 1b illustrates an N-bit digital phase shifter of the invention.
Figure 1C:
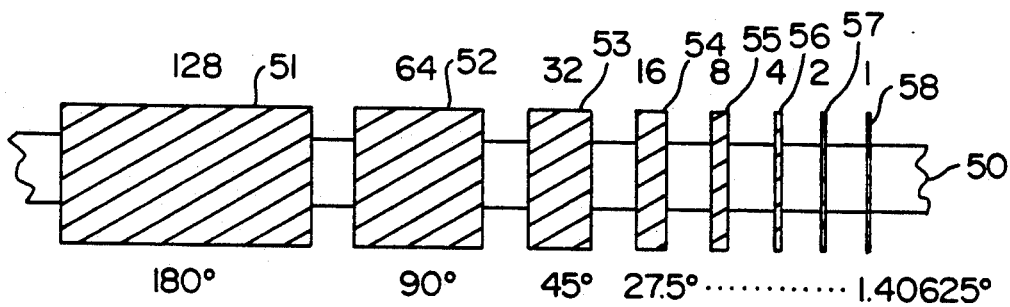
FIG. 1c illustrates an 8-bit digital phase shifter in accordance with the invention.

FIGS. 1c–1c illustrate the fundamental operation of the present invention. FIG. 1a shows an analog distributed phase shifter comprised of an electromagnetic waveguide 50 and an analog phase shifter 59. It is assumed that the device is uniform along its length so that the phase shift produced by any given length along the line is the same as any other. It is also assumed that the distributed phase shifter produces a normalized phase shift of 360° with an applied voltage of, for example, 5 volts and 0° with, for example, 0 volts applied. The $L_{2\pi}$ represents the length of the analog phase shifter required to produce the 360° ($2\pi$) phase shifter.

FIG. 1b shows the phase shifter from FIG. 1a partitioned into N discrete sections. A length of each section is related by a geometric relationship to the power of 2.

Assuming that the Figure-Of-Merit, the FOM, is known for any optical or RF waveguide. The FOM is defined as the change in phase shift ($\Delta\theta$) per unit length per applied voltage change, i.e., $$FOM = \frac{\Delta\theta}{\Delta V \cdot L}$$

where L is the length of $\Delta V$ is the voltage change. For a selected total phase shift, $\Delta\theta_T$, and a desired voltage differential, $\Delta V$, e.g., for 0 to 5 volts, $\Delta V = 5V$, the length, $L_T$, of the waveguide required to produce the total phase shift is:

$$L_T = \frac{\Delta\theta_T}{FOM \, \Delta V}$$

The length of any given section n is $L_n = L_T/2^n$. Note that for $n = 1$, the electrode length is $L_T/2$ and is longest; but where $n = N$, and , in the case of FIG. 1c, where $N = 8$, the electrode length is $L_8 = L_T/256$ and is the shortest.

Each section produces a phase shift of $\Delta\phi_T/(2^n)$, where $\Delta\phi_T$ is the total phase shift desired which, in general, can be any desired value, commonly 360°, produced by length $L_T$. The total phase shift of the device is expressed as:

$$\Delta\phi = \sum_{n=0}^{N-1} \frac{V_a}{\Delta V} \frac{\phi_T}{2^n}$$

where $V_n$ is the voltage to the nth section. The above equation applies only if the reference voltage is 0 volts and V is the other applied voltage such that $V_n/\Delta V$ is equal to 0 or 1 only, hence the digital control. As long as the lengths of the sections are related by $L_T/(2^n)$, the phase shift produced ($\Delta\phi$) is controlled linearly by the applied binary word with maximum phase shift $[\Delta\phi_T(2^{N-1})]/2^N$, where, in this case, N=8.

FIG. 1c shows the phase shifter from FIG. 1a partitioned into eight discrete sections. It is assumed that $\Delta\phi_T=360°$ and for illustrative purposes $L_T=456$ μm. A length of each section is related by a geometric relationship to the power of 2. The phase shifter is comprised of the electromagnetic waveguide 50 and discrete phase shifters 51, 52, 53, 54, 55, 56, 57, 58. Numbers above the phase shifters 51, 52, 53, 54, 55, 56, 57, 58 represent the lengths of the phase shifters 51, 52, 53, 54, 55, 56, 57, 58. The largest section is of length $L_T/2$ because $L_T=256$, $L_T/2=128$. When an applied DC voltage is changed from 0 to 5 volts, the $L_T/2$ section produces 180° of phase shift. The next largest section is of length $L_T/4$. When a voltage of 5 volts is applied to this section, it produces 90° of phase shift. Numbers below each phase shifter represent the phase shift produced by the respective phase shifter. The smallest section has a length of $L_T/2^N$, where N is the total number of discrete phase shifter sections. Therefore, the smallest section has a length of 1 micrometer. By appropriately applying 0 or 5 Volts (0 or 1's) to the sections of such a structure any phase shift between 0° to 360°, with a resolution of $360°/(2^N)$, is produced. Furthermore, with the most significant bit, MSB, of an 8 bit word coupled to the largest section, the least significant bit, LSB, attached to the smallest section, and all other bits connected correspondingly in between, the binary value (J) applied to a phase shifter section produces a linear phase shift in proportion to the binary value ($J360°/(2^N)$).

Optical waveguide phase modulators operate by changing the modal index of refraction of the waveguide, resulting in a change in the phase velocity of an optical signal passing through the guide, with a relative phase shift accumulating with length. Four detailed physical phenomenon responsible for the net shift in the modal index of the waveguide are:

(1) the linear electrooptic effect, related to the biaxial birefringence of the material under an applied electric field;

(2) the electrorefractive effect, or Franz-Keldysh effect, which causes a red-shift of the absorption edge under an applied electric field which corresponds to a refractive index change via Kramers-Kronig relations;

(3) the plasma effect, due to free-carrier adsorption altering the refractive index as free-carriers are removed from the material by the depletion edges of a p-n junction; and (4) the band-filling effect, which causes a red-shift of the fundamental adsorption edge and an increase in the refractive index upon depletion of free carriers from doped material.

All four effects contribute to the total shift in modal index of the waveguide, although for energies well below the band-edge of the material the linear electrooptic effect dominates, followed by band-filling, electrorefraction, and the plasma effect, in that order. As a result, it is possible to adjust the phase shift at a fixed bias by changing the length of the phase modulator. Therefore, for example, if a 1 mm long device operates at 72°/V-mm (phase shift per unit length, per volt applied: $\Delta\phi/V_aL$) figure-of-merit (FOM), there is obtained approximately 360° phase shift of 5 volts; while a 500 micrometer long structure yields approximately 180° phase shift at 5 volts, and a 250 micrometer long device yields approximately 90° at 5 volts.

Because the total phase shift adds with series connected modulators, the invention couples together N modulators whose lengths vary as $L_{2\pi}/2^n$, where n ranges from 1 to N inclusive and for a total phase shift range of 0° to 360°, to form a N-bit digital phase modulator with a fixed voltage of $V_n=0$ or $360°(\text{FOM}\cdot L_{2\pi})^{-1}$. In this example the modulator is designed to provide a maximum relative phase shift of 360 and $L_{2\pi}$ is the total modulator length needed to achieve 360° phase shift at a fixed voltage $V_n$. There is thus obtained a binary-digital phase modulator whose total phase shift is given by the following equation:

$$\phi_T = \sum_{n=1}^{N} \Delta V_a \frac{FOM \cdot L_{2\pi}}{2^n}$$

where · denotes multiplication, L denotes length, $\Delta V_n$ denotes applied voltage change, and FOM denotes the figure of merit of the waveguide used.

Figure 3:
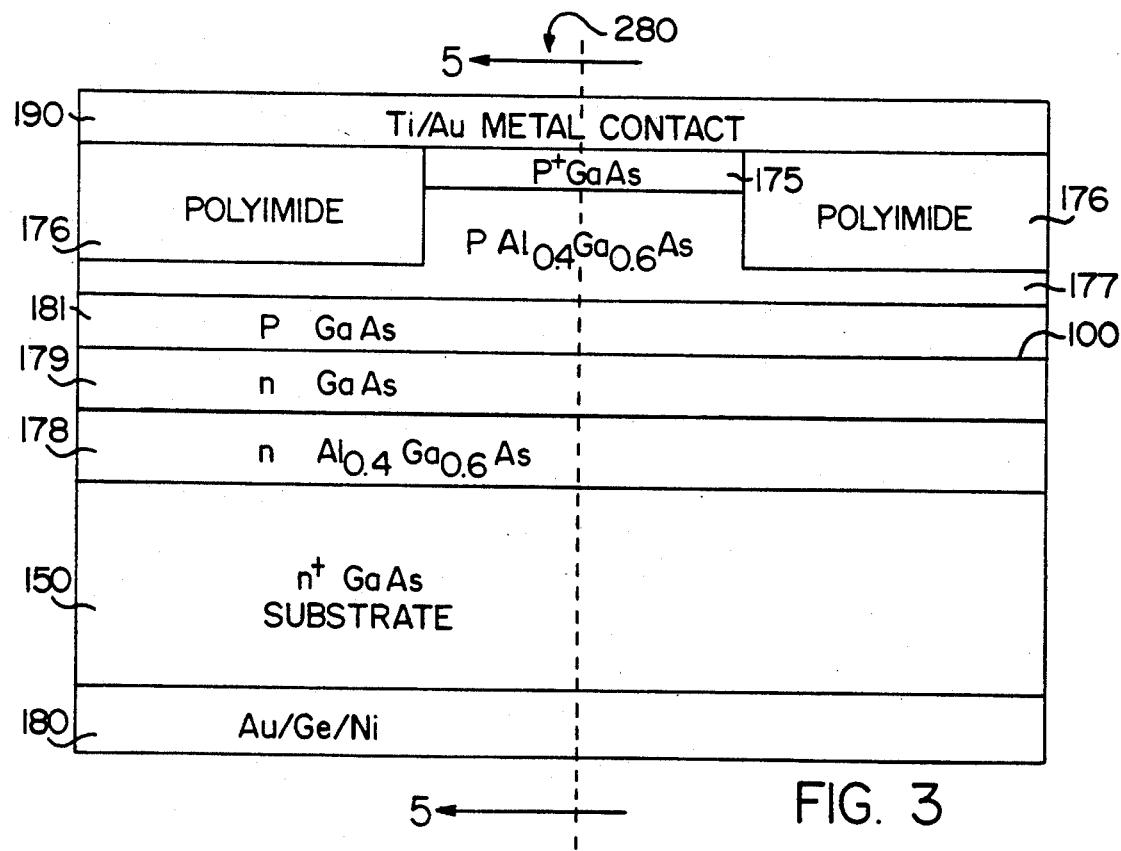
FIG. 3 illustrates a cross sectional view of a ridge waveguide phase modulator.

FIG. 3 shows a cross sectional view of a ridge-type waveguide phase modulator utilized by the present invention. The waveguide 280 is of a GaAs/AlGaAs double heterostructure design having a p-n junction 100 centrally located between GaAs waveguide layers 179 and 181. Both layers 179 and 181 are the "higher-index" layers of the optical waveguide 280. The light cannot distinguish carrier type so that both layers 179 and 181 simply appear as GaAs to the light. The shallow etched ridge waveguide design allows direct transitions from the phase modulator into directional couplers or other elements with a minimum of process steps.

The waveguide 280 shown in FIG. 3 maximizes modulation efficiency by using a 0.25 micrometer GaAs waveguide composed of n-type GaAs layer 179 and p-type GaAs layer 181 region interposed between an n-type AlGaAs cladding layer 178 and a p-type AlGaAs cladding layer 177. A p-n junction 100 is formed at the common edge of the n- and p-type GaAs layers 179 and 181. The total thickness of the GaAs layers 179 and 181, and the Al mole fraction of the cladding layers 177 and 178 are chosen to minimize the width of the optical mode perpendicular to the layers, parallel to the applied electric electric field. The lateral extent of the waveguide does not influence the modulation behavior, and is designed as a single-mode ridge-type guide with low loss.

The phase modulator operates by changing the modal index of refraction of the waveguide 280 under varying reverse bias, but the local refractive index of the material is only changed in the depletion zone of the p-n junction 100. The refractive index of a wave-transmission medium is the ratio between the phase velocity in free space and in the medium. Therefore, it is preferred to place the p-n junction 100 in the middle of the waveguide 280 to maximize the confinement of the optical mode in the reverse-biased depletion zone so that as much of the optical energy as possible of the region of the junction swept by the depletion zone under changing bias conditions. This maximizes the influence of the applied electric field and the depletion-edge translation on the modal index.

Referring to FIG. 3, a semiconductor layer 175, which is a heavily p+ doped material, is placed over the top surface of the p-type AlGaAs cladding layer 177. A planarizing layer of polyimide 176 is deposed over the portion of cladding layer 177 not covered by semiconductor layer 175. A metal contact 190 comprised of, for example, Ti/Au, is deposited over semiconductor layer 175 forming electrode 201 (see FIG. 5). Contact to the n-type layer 178 is made at the bottom of the n+ substrate 150, via a common contact layer 180 that is typically comprised of Au, Ge and Ni.

Figure 5:
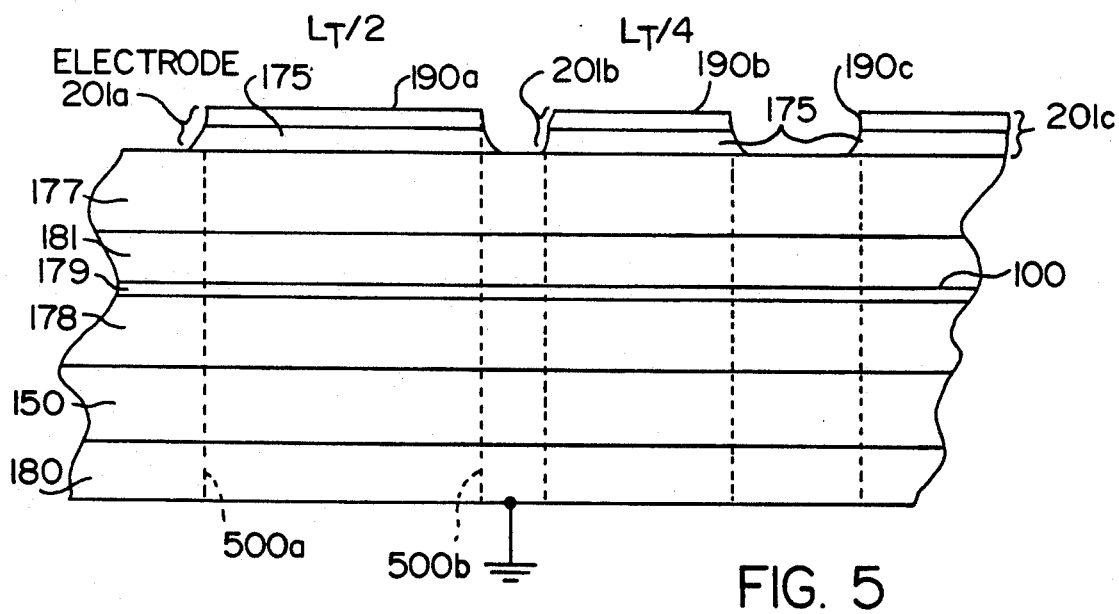
FIG. 5 illustrates a longitudinal cross sectional view taken along the section line 5—5 of FIG. 3.

Referring now to FIG. 5, the phase modulator is fabricated in such a manner that semiconductor layer sections 175 and the overlying metalization 190 are differentiated by at etching process. The resulting electrodes 201 are arranged in series along the top of the waveguide and are electrically isolated from one another.

It will be appreciated by those skilled in the art that, while the invention herein has been described using specific types of electrical conductivity within specific layers, the types of electrical conductivity within those layers can be reversed, so long as the relationship between the layers is preserved, i.e., a layer with p-type semiconductor may be replaced with a n-type semiconductor so long as any other p-type is replaced with an n-type.

Figure 2:
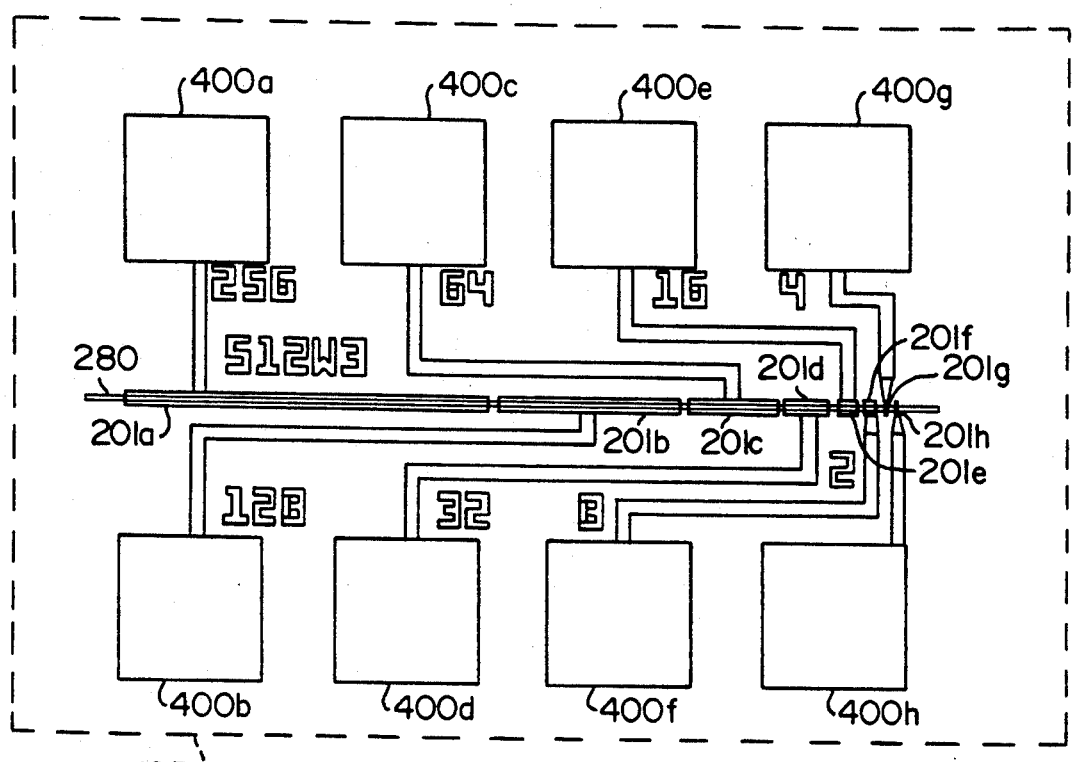
FIG. 2 illustrates a digital optical phase shifter in accordance with the invention.

A digitally controlled distributed phase shifter 195, based on these principles, is shown in FIG. 2. FIG. 2 shows a top view, not to scale, of a preferred layout of a distributed optical phase shifter in accordance with the invention. The phase shifter is shown with 8 bits of resolution. Electrodes 201a-h of appropriate lengths, such as 256, 128, 64, 32, 16, 8, 4, and 2 micrometers, are fabricated on the optical waveguide. The largest electrode 201a, which is connected to the MSB, is 256, ($2^8$), micrometers in length, and the shortest electrode 201h, which is connected to the LSB, is 2($2^1$) micrometers in length. When a bias voltage is applied to a particular electrode 201a-h, via control terminal 400a-h, respectively, a variation in the modal index is caused in the portion of the waveguide 280 corresponding to that particular electrode. Referring to FIG. 5, if a bias voltage is applied to the electrode having length $L_T/2$, via control terminal 400a (see FIG. 2 for control terminal 400a), the portion of waveguide 280 undergoing a change in modal index is represented by the area between the two vertical dotted lines 500a and 500 b.

A 10 bit digitally controlled distributed optical phase shifter would use segmented electrodes of 512, 256, 218, 64, 32, 16, 8, 4, 2 and 1 micrometers length placed in series over a single waveguide. As a result, a logic one signal applied to any combination of electrodes directly results in a digitally-coded phase shaft with 0.35° resolution.

The digitally controlled distributed optical phase shifter is inherently linearized. The phase shift derived at the LSB stage of the phase shifter network is equal to the resolution of the phase shifter network. Each individual section of the phase shifter only experiences applied biases of one of two possible state. Therefore, an individual section produces a corresponding phase shift of one of two possible amounts. Any nonlinearity between the two voltage states used is irrelevant. Thus, the device is inherently linear provided only that the N sections are related in length by $L_n = L_{n-1}/2$ and that the waveguide FOM is uniform across the total length. Because the length of each section is defined photolithographically, length errors are minimized.

Although the present invention is directed at digitally controlled distributed optical phase shifters, the technique of the present invention is equally applicable to distributed microwave phase shifters. Virtually any application of distributed microwave phase shifters may utilize digital drive, thus indicating the utility of the present invention.

Figure 4:
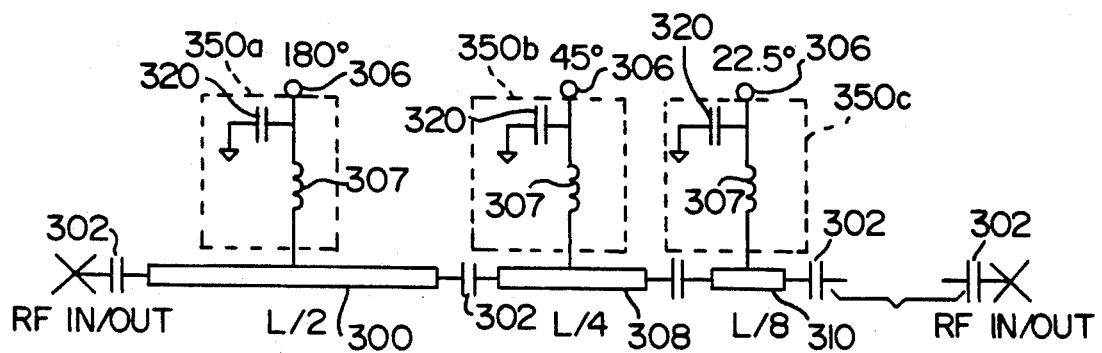
FIG. 4 illustrates a digitally controlled distributed microwave phase shifter.

FIG. 4 shows a schematic of an embodiment of a digitally controlled distributed microwave phase shifter. The rectangular elements 300, 308 and 310 represent distributed radio frequency voltage-controlled phase shifters and are related in length by $L_n = L_{n-1}/2$ wherein n has values ranging from 1 to N. N is the number of phase shifters within the phase shift network and $L_1$ is the length of the longest electrode. Each section is comprised of a distributed microwave phase shifter, a blocking capacitor 302, and bias network 350 which may be comprised of, for example, inductor 307 and capacitor 320. One section is required for each bit of resolution desired. The bi-state bias voltage is applied to the control terminal 306 of each phase shifter. Each section is capacitively coupled via capacitor 302 to the next and bias networks 350a-c, are used to independently control the bias to each section. The length of an electrode is chosen for an rf phase shifter analogously with the optical phase shifter. Except for the mechanism of phase shift, all design considerations presented for the optical digital phase shifter are identical for microwave phase shifters. The voltage-controlled distributed microwave phase shift could be produced by several means available to one skilled in the art. One possible approach would be the use of a microwave transmission line fabricated on a suitable semiconductor surface. The transmission line structure could be, for example, of microstrip or coplanar-waveguide type. It could further be designed to be slow-wave, which would enhance the phase shift per unit length. The semiconductor would preferably be configured to be a p-n junction along the length of the transmission line within the region of maximum electric field from the said transmission line. As the bias is then varied on the transmission line, the depletion layer thickness will vary within the p-n junction, thus varying the capacitance per unit length of the transmission line. Because the velocity of propagation along an electrical transmission line is $$v_p = \frac{1}{\sqrt{LC}},$$

a change in capacitance causes a change in velocity and hence a change in phase shift through the transmission line. Thus, a voltage-controlled distributed phase shift is formed.

Other approaches to distributed phase control are easily envisioned, i.e. microwave waveguides loaded with ferrites thereby requiring magnetic control, analogous to electrical control. In short, any distributed phase control structure can be made digitally controlled and linear by the technique used in our invention.

Phase control of optical rf/microwave signals has numerous applications. For example, in communications, information is often applied to a carrier signal by phase modulation (PM). In particular, in digital communications, digital data is commonly represented by phase changes of the carrier signal (PSK—Phase-Shift Keying). The digital control technique of the present invention is useful for such modulation schemes.

In coherent optical systems, e.g., coherent optical telephone, cable TV and data systems, phase shifts for modulation and signal "trimming" are necessary. Since all such systems typically use computers for control, digital control of these phase shifters is advantageous. An example of a specific rf/microwave application is in the phase control for phased-array antennas where the phase of each antenna element is controlled by a digital means, in general, phase control is critical in virtually any coherent communication/signal processing application.

Based on the foregoing teaching those having ordinary skills in the art may derive modifications to the embodiments of the invention disclosed above. The invention is therefore not to be construed to be limited only to these disclosed embodiments, but it is instead intended to be limited only as defined by the breadth and scope of the appended claims.

What is claimed is:

1. A phase shift network comprising a plurality discrete phase shifters each of which controllably provides a different binary weighted amount of phase shift to a coherent radiation signal passing therethrough in comparison to an unshifted coherent radiation signal having the same frequency, each of said discrete phase shifters having a binary weighted length.

2. The phase shift network as set forth in claim 1 wherein each of said phase shifters includes a control terminal for coupling to a control signal that controls, in a first state, said phase shifter to apply the associated binary weighted amount of phase shift to said radiation signal or, in a second state, not to apply a phase shift to said radiation signal.

3. The phase shifter network as set forth in claim 2 wherein each of said phase shifters is comprised of an electrode, wherein said electrode is comprised of a voltage/current varying means coupled to a phase shift medium, said electrode having a binary weight length.

4. The phase shifter network as set forth in claim 3 wherein each of said electrodes are related in length by $L_n = L_{n-1}/2$, where n has values ranging from 1 to N and N is the number of phase shifters within the phase shift network, and $L_1$ is the length of a longest electrode.

5. The phase shifter network as set forth in claim 4 wherein the electrode having the greatest length $L_1$ has a control terminal coupled to said control signal that is representative of a most significant bit of a multibit digital control word wherein the length of the longest electrode is equal to $L_T/2$ where $L_T$ is the length required to produce the total phase shift required.

6. The phase shifter network as set forth in claim 5 wherein said first and second states of said control signal cause a variation in the velocity of propagation of said radiation signal in a portion of said waveguide, said portion having a length equal to the associated electrode.

7. The phase shifter network as set forth in claim 6 wherein said phase shifter network includes:
   (a) an electrically conductive layer;
   (b) a substrate overlying said electrically conductive layer;
   (c) a first semiconductor layer, functioning as a cladding layer, and having a first type of electrical conductivity and overlying said substrate;
   (d) a second semiconductor layer having the same type of electrical conductivity as said first semiconductor layer and overlying said first semiconductor layer;
   (e) a third semiconductor layer having a second type of electrical conductivity and overlying said second semiconductor layer, said third semiconductor layer and said second semiconductor layer forming a p-n junction and a waveguide region;
   (f) a fourth semiconductor layer, functioning as a cladding layer, and having a second type of electrical conductivity and overlying said third semiconductor layer, wherein said first, second, third and fourth semiconductor layers comprise said phase shift medium;
   (g) an insulating layer overlying said fourth semiconductor layer; and
   (h) a plurality of serially disposed semiconductor regions overlying said fourth semiconductor layer, each of said semiconductor regions having a second type of electrical conductivity and being conductively coupled to a corresponding metal contact through said insulating layer.

8. The phase shift network as set forth in claim 6 wherein said radiation signal is optical radiation.

9. The phase shift network as set forth in claim 6 wherein said radiation signal is radio frequency radiation.

10. A digitally controlled distributed optical phase shifter network comprising a plurality of discrete optical phase shifters each of which controllably provides a different binary weighted amount of phase shift to an coherent optical signal passing through, each of said discrete optical phase shifters having a binary weighted length, said digitally controlled distributed optical phase shifter having a total phase shift equal to a sum of the phase shift provided by each discrete optical phase shifters.

11. The digitally controlled distributed optical phase shifter network as set forth in claim 10 wherein each of said discrete optical phase shifters includes a control terminal for coupling to a control signal that controls, in a first state, said phase shifter to apply the associated binary weighted amount of phase shift to said optical signal or, in a second state, not to apply shift to said optical signal.

12. The digitally controlled distributed optical phase shifter network as set forth in claim 11 wherein each of said phase shifters is comprised of an electrode, wherein said electrode is comprised of a metal contact conductively coupled to a phase shift medium, said electrode having a binary weighted length.

13. The digitally controlled distributed optical phase shifter network as set forth in claim 12 wherein each of said electrodes are related in length by $L_n = L_{n-1}/2$ where N is the number of phase shifters within the phase shift network, $L_1$ is the length of the longest electrode, and n has values ranging from 1 to N.

14. The digitally controlled distributed optical phase shifter network as set forth in claim 13 wherein said electrode having the longest length $L_1$ has a control terminal coupled to said control signal, said control signal being representative of the most significant bit of said multibit digital control word, $L_1$ being equal to $L_T/2$ where $L_T$ is the length required to produce the total phase shift required.

15. The digitally controlled distributed optical phase shifter network as set forth in claim 11 wherein said first and second states of said control signal cause a variation in a modal index of refraction of a portion of said waveguide, said portion having a length equal to the associated electrode.

16. The digitally controlled distributed optical phase shifter network as set forth in claim 13 wherein said phase network includes:
   (a) an electrically conductive layer;
   (b) a substrate overlying said conductive layer;
   (c) a first semiconductor cladding layer having a first type of electrical conductivity overlying said substrate;
   (d) a second semiconductor layer having the same type of electrical conductivity as said first semiconductor cladding layer and overlying said first semiconductor cladding layer;
   (e) a third semiconductor layer having a second type of electrical conductivity and overlying said second semiconductor layer, said second semiconductor layer and said third semiconductor layer forming a p-n junction and a waveguide;
   (f) a fourth semiconductor layer, functioning as a cladding layer, and having a second type of electrical conductivity and overlying said third semiconductor layer, wherein said first, second, third and fourth semiconductor layers comprise said phase shift medium;
   (g) an insulating layer overlying said fourth semiconductor layer; and
   (h) a plurality of serially disposed semiconductor regions overlying said fourth semiconductor layer, each of said semiconductor regions having a second type of electrical conductivity and being conductively coupled to a corresponding metal contact through said insulating layer.

17. A phase shifter network which controllably provides a phase shift to a coherent radiation signal in comparison to an upshifted coherent signal of the same frequency, comprising:
   (a) an electrically conductive layer;
   (b) a substrate overlying said conductive layer;
   (c) a first semiconductor layer, functioning as a cladding layer, and having a first type of electrical conductivity overlying said substrate;
   (d) a second semiconductor layer, functioning as a cladding layer, and having a first type of electrical conductivity and overlying said first semiconductor layer;
   (e) a third semiconductor layer having a second type of electrical conductivity and overlying said second semiconductor layer, said third semiconductor layer and said second semiconductor layer forming a p-n junction and a waveguide region;
   (f) a fourth semiconductor layer, functioning as a cladding layer, and having a second type of electrical conductivity and overlying said third semiconductor layer, wherein said first, second, third and fourth semiconductor layers comprise said phase shift medium;
   (g) an insulating layer overlying said fourth semiconductor layer; and
   (h) a plurality of serially disposed semiconductor regions overlying said fourth semiconductor layer, each of said semiconductor regions having a second type of electrical conductivity and being conductively coupled to a corresponding metal contact through said insulating layer to controllably provide a different binary weighted amount of phase shift to said coherent radiation signal passing through said waveguide region, each of said semiconductor regions having a binary weighted length.

18. A digitally controlled distributed phase shifter network wherein said phase shifter network includes:
   (a) an electrically conductive layer;
   (b) a substrate overlying said electrically conductive layer;
   (c) a first semiconductor cladding layer having a first type of electrical conductivity overlying said substrate;
   (d) a second semiconductor cladding layer having a first type of electrical conductivity as said first semiconductor cladding layer and overlying said first semiconductor layer;
   (e) a third semiconductor layer having a second type of electrical conductivity and overlying said second semiconductor layer, said second semiconductor layer and said third semiconductor layer forming a p-n junction and a waveguide;
   (f) a fourth semiconductor layer, functioning as a cladding layer, and having a second type of electrical conductivity and overlying said third semiconductor layer, wherein said first, second, third and fourth semiconductor layers comprise said phase shift medium;
   (g) an insulating layer overlying said fourth semiconductor layer; and
   (h) a plurality of serially disposed semiconductor regions overlying said fourth semiconductor layer, each of said semiconductor regions having a second type of electrically conductivity and being conductively coupled to a corresponding metal electrode through said insulating layer to controllably provide a different binary weighted amount of phase shift to said coherent radiation signal passing through said waveguide region by causing a variation in the velocity of propagation of said radiation signal in a portion of said waveguide; each of said semiconductor regions having a binary weighted length; and
   (i) a plurality of said metal electrodes conductively coupled to each of said semiconductor regions and to said phase shift medium for coupling to a control signal that controls, in a first state, said semiconductor region to apply the associated binary weighted amount of phase shift to said radiation signal, or, in a second state, not to apply a phase shift to said radiation signal, wherein each of said electrodes are related in length by $L_n = L_{n-1}/2$ where n has values ranging from 1 to N and where N is the number of said phase shifters within the phase shift network, and $L_1$ is the length of the longest electrode which has a control terminal coupled to said control signal, said control signal being representative of the most significant bit of said multibit control work, $L_1$ being equal to $L_T/2$ where $L_T$ is the length required to produce the total phase shift required.

19. A phase shift network for radio frequency coherent radiation, comprising:
(a) a transmission line, further comprising a plurality of discrete phase shifters of binary weighted lengths, said phase shifters coupled together by a plurality of coupling capacitors interposed between each of said phase shifters;
(b) control means provided by a plurality of bias networks, each bias network operatively connected to each phase shifter wherein said bias network provides a control signal to said phase shifters while maintaining isolation from said transmission line; wherein said control signal is a low frequency control bias which controllably provides a different binary weighted amount of phase shift to said coherent radiation signal passing through said phase shifter by causing a variation in the velocity of propagation of said radiation signal, each of said phase shifters having a binary weighted length; and wherein each of said phase shifters are related in length by $L_n = L_{n-1}/2$ where n has values ranging from 1 to N and where N is the number of said phase shifters within the phase shift network, and $L_1$ is the length of the longest electrode which has a control terminal coupled to said control signal, said control signal being representative of the most significant bit of said multibit digital control word, $L_1$ being equal to $L_T/2$ where $L_T$ is the length required to produce the total phase shift required.

* * * * *